(12) United States Patent
Lum

(10) Patent No.: US 8,599,589 B2
(45) Date of Patent: Dec. 3, 2013

(54) METHODS AND SYSTEMS FOR REDUCING POWER CONSUMPTION

(75) Inventor: David W. Lum, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1108 days.

(21) Appl. No.: 12/250,522

(22) Filed: Oct. 13, 2008

(65) Prior Publication Data

US 2010/0091531 A1 Apr. 15, 2010

(51) Int. Cl.
*H02M 5/42* (2006.01)
*H02M 3/335* (2006.01)

(52) U.S. Cl.
USPC .................. 363/84; 363/21.09; 363/21.17

(58) Field of Classification Search
USPC .............. 363/15, 21.05, 21.09, 34, 84, 21.17; 700/297; 323/266, 269, 270
See application file for complete search history.

(56) References Cited

U.S. PATENT DOCUMENTS

| | | | | |
|---|---|---|---|---|
| 5,680,075 A * | 10/1997 | Sacca | ............................ | 330/279 |
| 6,320,766 B1 | 11/2001 | Park | | |
| 6,657,415 B2 * | 12/2003 | Saeki et al. | ..................... | 320/125 |
| 6,982,984 B1 | 1/2006 | Asayesh et al. | | |
| 7,315,955 B2 * | 1/2008 | Yamazaki et al. | ............. | 713/340 |
| 7,355,362 B2 | 4/2008 | Pai et al. | | |
| 7,359,224 B2 * | 4/2008 | Li | ................................... | 363/89 |
| 8,032,771 B2 * | 10/2011 | Rangeley | ....................... | 713/320 |
| 2003/0009701 A1 | 1/2003 | Kurosawa | | |
| 2003/0058002 A1 * | 3/2003 | Horiguchi et al. | ............. | 326/121 |
| 2003/0093501 A1 | 5/2003 | Carlson et al. | | |
| 2003/0231009 A1 * | 12/2003 | Nemoto et al. | ................. | 323/276 |
| 2004/0148531 A1 | 7/2004 | Yamazaki et al. | | |
| 2005/0099750 A1 * | 5/2005 | Takahashi et al. | ............... | 361/92 |
| 2006/0294403 A1 * | 12/2006 | Bennett | .......................... | 713/300 |
| 2007/0260753 A1 * | 11/2007 | Komatsu et al. | ................... | 710/1 |
| 2009/0037768 A1 * | 2/2009 | Adams | ............................ | 714/14 |
| 2009/0138734 A1 * | 5/2009 | Uchida | ........................ | 713/310 |
| 2009/0251205 A1 * | 10/2009 | Lin | ................................ | 327/544 |

FOREIGN PATENT DOCUMENTS

| | | |
|---|---|---|
| JP | 04-359676 | 12/1992 |
| JP | 2006-187159 | 7/2006 |
| KR | 2002-0011017 | 2/2002 |
| TW | M277989 | 10/2005 |
| TW | I281105 | 5/2007 |

OTHER PUBLICATIONS

PCT Notification of Transmittal of the International Search Report and Written Opinion of the International Searching Authority, or the Declaration, for the PCT Int'l. Appln. No. US2009/060255, mailed Feb. 9, 2010, (18 pages).

PCT International Preliminary Report on Patentability for International Application No. PCT/US2009/060225, mailed Apr. 28, 2011, 13 pages.

Lee, "Characteristics Improvement of Two Transistor Forward Converter using PFC and Lossless Snubber Circuit," Doctor's Thesis of Dongguk University, 101 pgs., Dec. 23, 2004.

\* cited by examiner

*Primary Examiner* — Adolf Berhane
*Assistant Examiner* — Emily P Pham
(74) *Attorney, Agent, or Firm* — Blakely, Sokoloff, Taylor & Zafman LLP

(57) ABSTRACT

Methods and systems for managing power are described. In one embodiment of a method, a DC input voltage from an AC mains to DC converter, inputted to a DC to DC converter, is adjusted lower while maintaining substantially constant DC output voltage from the DC to DC converter in order to improve power efficiency.

34 Claims, 10 Drawing Sheets

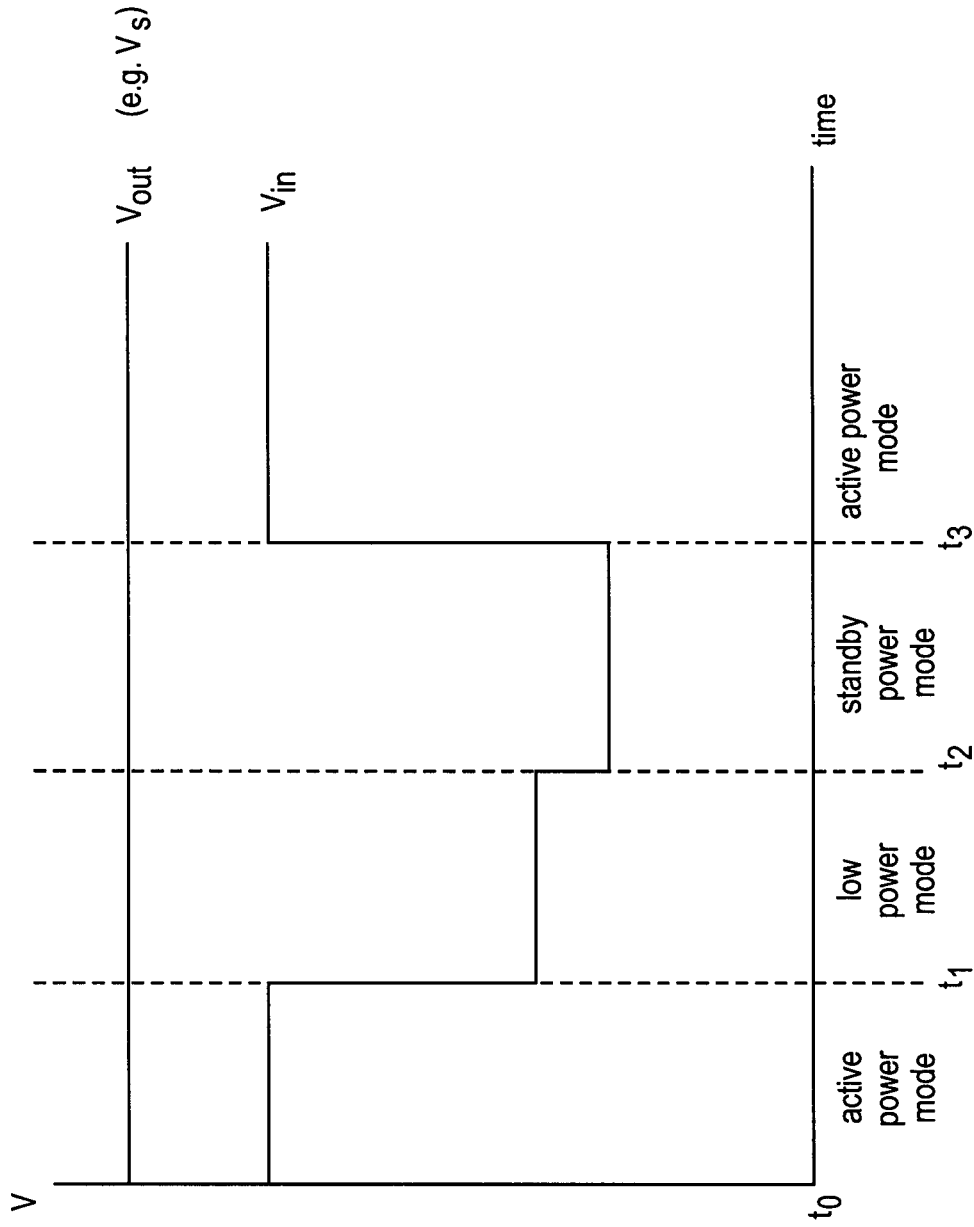

METHODS AND SYSTEMS FOR REDUCING POWER CONSUMPTION

FIELD OF THE INVENTION

This disclosure relates generally to systems for managing power consumption, and in particular, in one embodiment, relates to systems for managing power consumption in various system states.

BACKGROUND INFORMATION

Countries worldwide have adopted various programs to set standards for certifying efficient energy use of consumer products. Programs such as the Energy Star and the TCO label consumer products that are energy efficient. These programs specify levels of efficiency required for the certification of different categories of products. The programs certify products that are more efficient than a specified level of efficiency. Regarding the certification of data processing systems, the programs assess the efficiency of energy consumption based on three states of operation: active, low power, and standby.

A data processing system operating in active state is in full operation in the system. A data processing system operating in low or standby state remains active to react to user controls or commands from a controller, but some or most of the components are turned off to reduce overall power consumption. To monitor user controls or commands, some of the circuitry of the data processing system must remain active while operating in these states. A system power converter regulates the output voltage and power level from the AC power supply. Currently, both the system power converter and the AC power supply operate at an efficiency level of 50% or less, while the data processing system is operating in low power or standby mode. Therefore, the net power efficiency level for the AC power supply and the system power converter is at 25% or less.

SUMMARY OF THE DESCRIPTION

The present invention relates to reducing the level of energy consumption and/or improving the level of efficiency for a data processing system that is operating in active, low energy, or standby states. While operating in these states, a controller remains active to determine which state the data processing system is operating in.

In one aspect, system efficiency is achieved by decreasing the input voltage fed into one or more DC-to-DC converters, while maintaining the output. The efficiency of at least one power converters is inversely related to the input/output voltage ratio of the power converter. Therefore, efficiency is improved by decreasing the input voltage of a DC-to-DC converter, while maintaining the output voltage at a substantially fixed value or within a small range.

In another aspect, system efficiency is achieved by controlling the ratio between the input and output voltage of a DC-to-DC converter(s). A controller may control the ratio between the input and output voltage of a DC to DC converter by adjusting the input voltage to the DC to DC converter while fixing the output voltage. The input voltage which is adjusted can be the DC output voltage from an AC to DC converter, which is controlled by the controller which receives power from the DC to DC converters.

The present invention is described in conjunction with systems and methods. In addition to the aspects of the present invention described in this summary further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

FIG. 7 shows a graph of two voltages (Vout and Vin) over time.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure, or characteristic described in connection with the embodiment is included in at least one embodiment of the invention. The appearance of the phrase "in one embodiment" in various places in the specification do not necessarily refer to the same embodiment.

The invention described herein provides various embodiments of a method and system for reducing the level of energy consumption and for improving the level of efficiency for a data processing system. As many data operating systems operate at an efficiency level of less than 25% when the device is in low and standby power state, the various embodiments of the system and method described herein may be implemented as part of the data processing system to improve the consumption rate to reach a predetermined level of efficiency. The various embodiments of the system and method described herein may be incorporated as part of a data processing system.

Figure 1A:
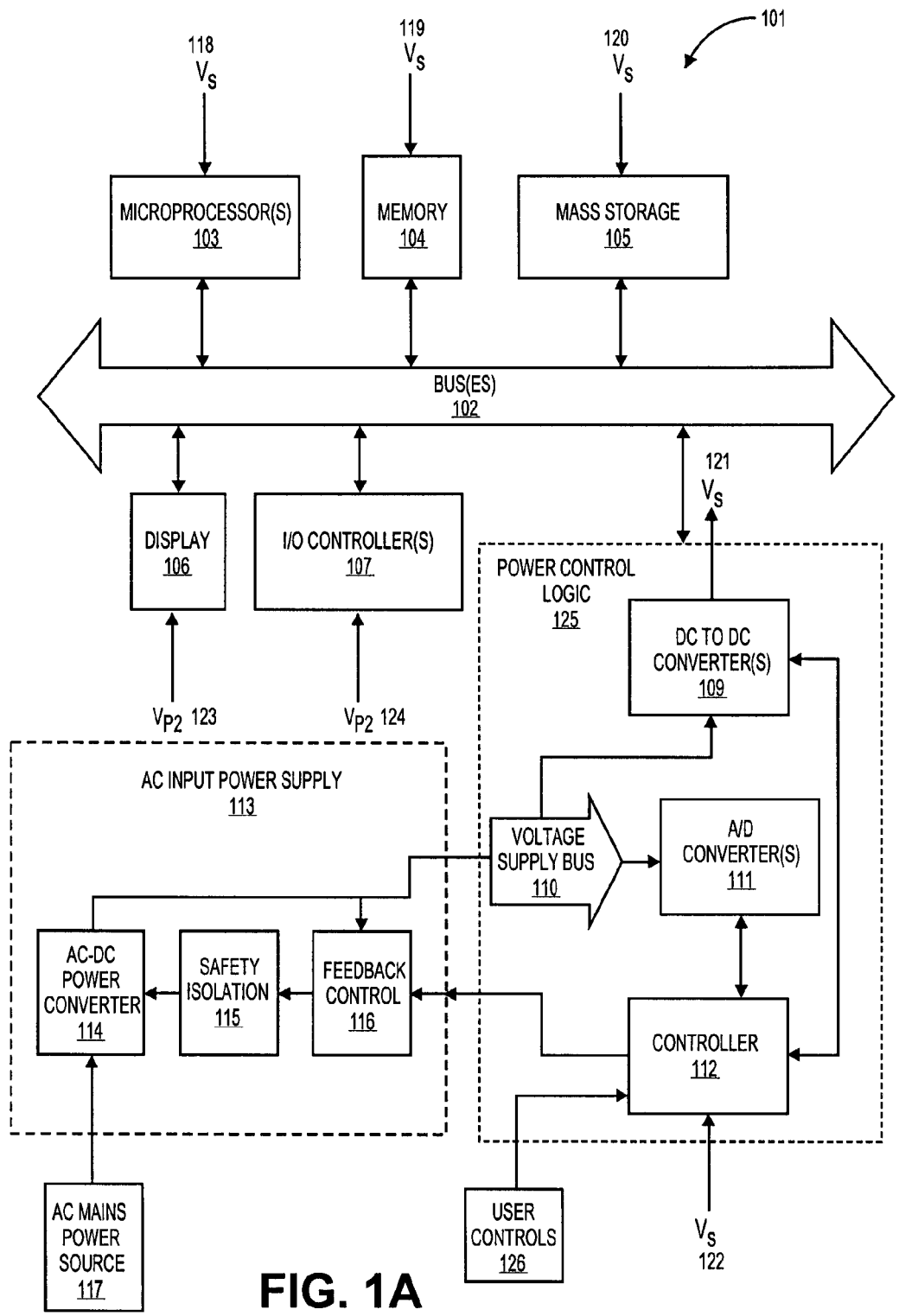
FIG. 1A illustrates a data processing system, such as a computer system, and the environment in which at least certain of the embodiments of the method and system described herein may be implemented.

The following description of FIG. 1A is intended to provide an overview of the hardware and other operating components suitable for implementing at least certain embodiments of the invention described below, but is not intended to limit the applicable environment or any particular architecture or manner of interconnecting the components as such details are not germane to the present invention. One of skill in the art will appreciate that the invention can be practiced with other data processing configurations, including handheld devices, cellular telephones, multiprocessor systems, microprocessor-based or programmable consumer electronics/appliances, and network PCs, minicomputers, mainframe computers, and the like. It will also be appreciated that personal digital assistants (PDAs), media players (e.g. an iPod), devices which combine aspects or functions of these devices (e.g. a media player combined with a PDA and a cellular telephone in one device), an embedded processing device within another device, network computers, a peripheral device (e.g., a display device, a printer, a harddrive or other storage device, a network interface device such as a wireless router, etc.), a consumer electronic device, and other data processing systems which have fewer components or perhaps more components may also be used with or to implement one or more embodiments of the present invention. The data processing system of FIG. 1A may, for example, be a Macintosh computer from Apple Inc.

FIG. 1A illustrates a data processing system, such as a computer system and the environment in which the embodiments of the method and system described herein may be implemented.

As shown in FIG. 1A, the computer system 101, which is a form of a data processing system, includes a processor 103. Processor 103 may be configured to monitor the operative state of computer system 101 (e.g., active, low power, or standby). Although only one processor is shown, two or more microprocessors may be included in computer system 101. Memory 104 may be any form of memory known to those skilled in the art. Information is read from and written to mass storage 105. Mass storage 105 may be any kind of machine readable medium including, for example, magnetic media such as disk drives and magnetic tape; optical drives such as compact disk read only memory (CD-ROM) and readable and writeable compact disks (CD-RW); stick and card memory devices; ROM, RAM, flash memory devices and the like. Display 106 may be any display monitor known to those skilled in the art, including, for example, a cathode ray tube (CRT) display monitor and thin film transistor (TFT) display screen. Computer system 101 may also include an I/O controller 107, wherein input devices such as keyboard and mouse or output devices (e.g., printer, network interface device, etc.) may be coupled to the computer system 101. The input devices may be any input device known to those skilled in the art and the output devices may be any output device known to those skilled in the art.

Computer system 101 may comprise a bus 102 to facilitate connection between its various hardware components. Microprocessor 103, memory 104, Mass storage 105, display 106, and I/O controller 107 may be coupled to one another and communicate with one another over bus 102. Bus 102 may be any bus known to those skilled in the art. Although only one bus is shown, two or more buses may be included in computer system 101.

Figure 6A:
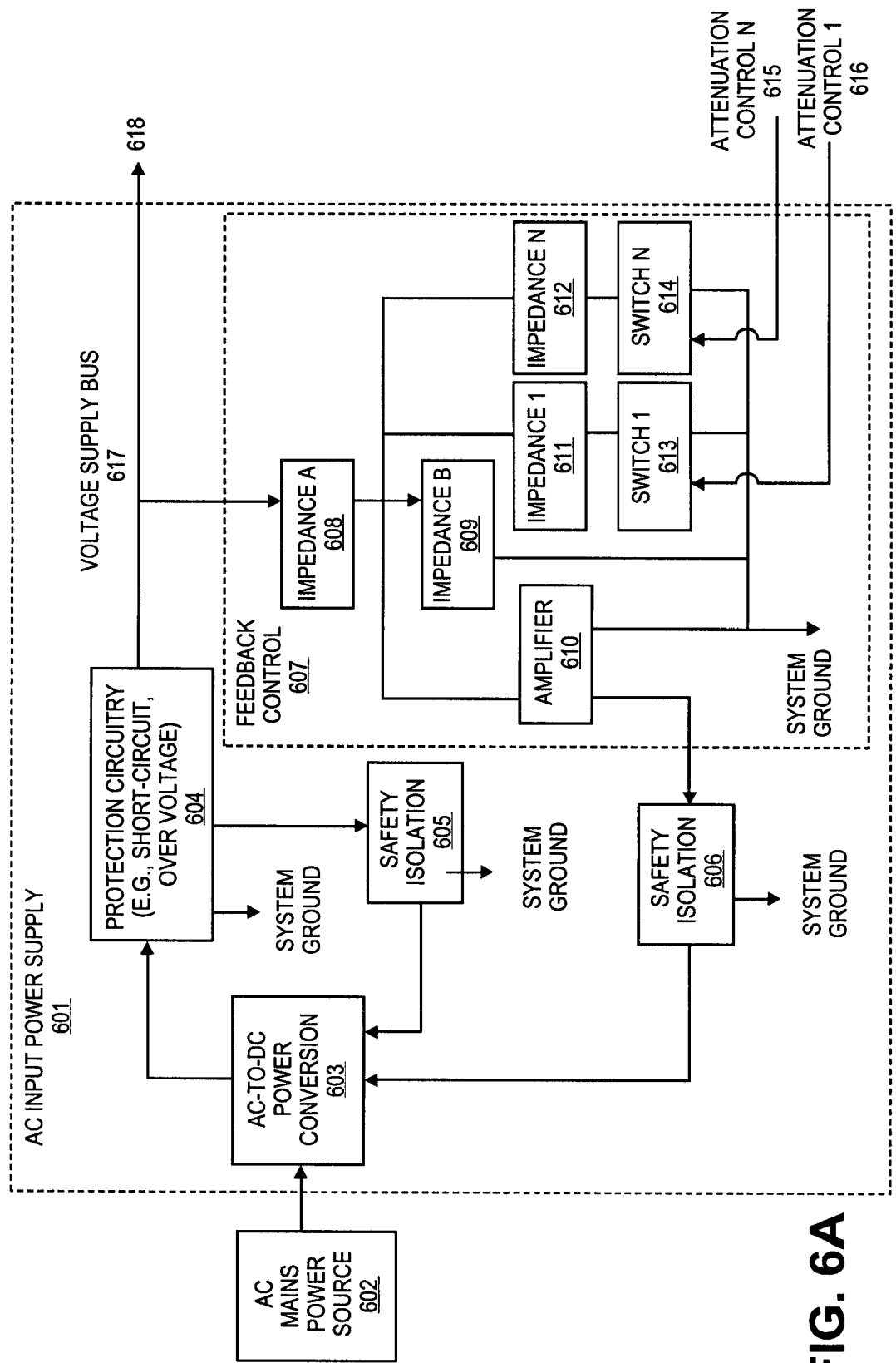
FIG. 6A illustrates an AC input power supply unit according to one embodiment of the present invention.
Figure 6B:
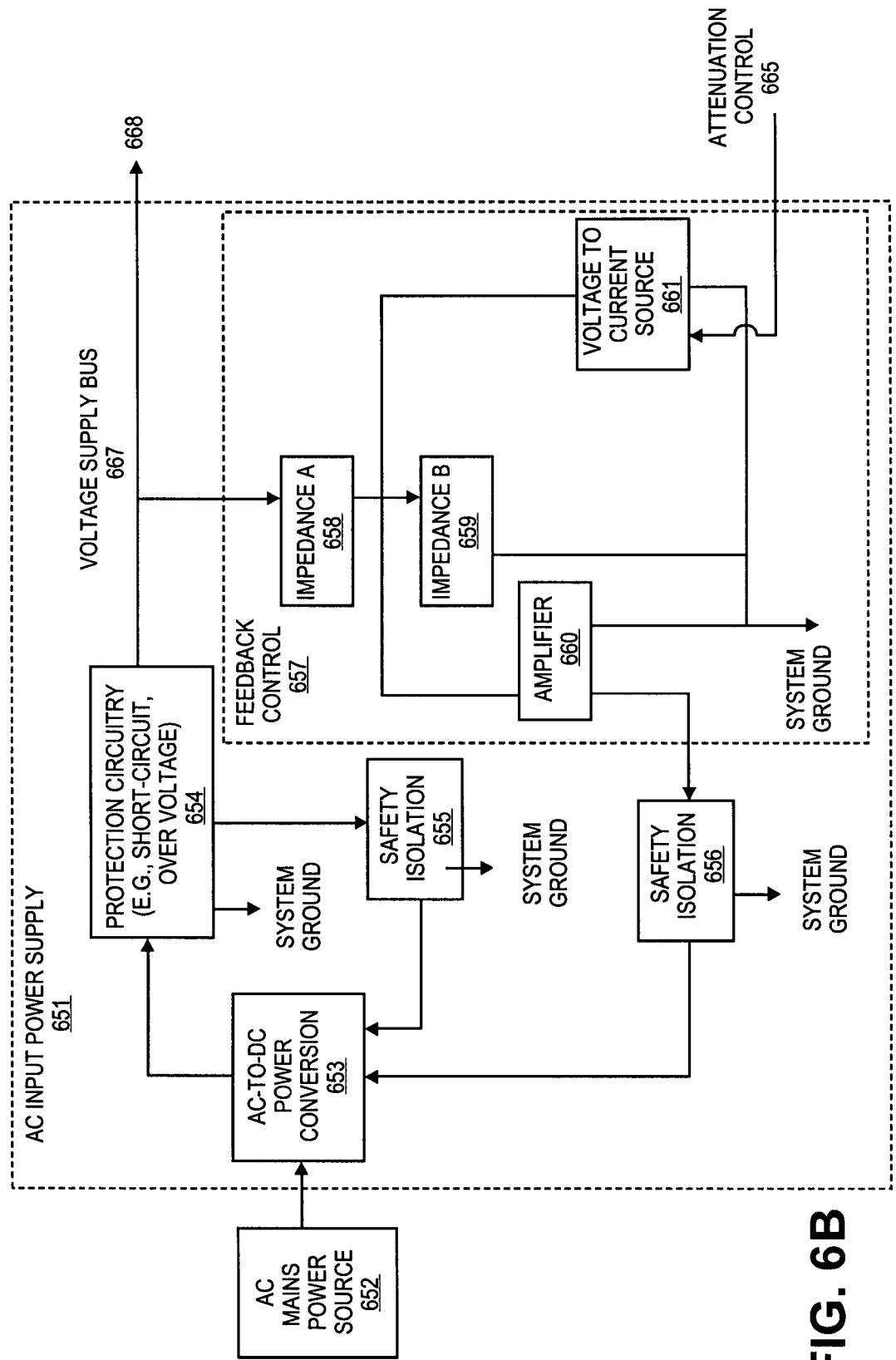
FIG. 6B illustrates an AC input power supply unit according to another embodiment of the present invention.

Power can be provided to the computer system 101 by a power supply system which includes the AC input power supply 113 and the power control logic 125. AC input power supply 113 includes an input to receive AC mains power source 117 (e.g., 120V AC in the USA); this input provides an AC voltage to the AC-DC power converter 114 which converts (e.g., rectifies) the AC voltage (e.g. from a convention wall outlet) to a DC voltage which is applied on the voltage supply bus 110. The AC input power also includes a safety isolation circuit 115 and a feedback control circuit 116. The safety isolation circuit 115 isolates the feedback control circuit 116 (and controller 112) from the AC-DC power converter 114 so high voltage or current from the AC-DC power converter 114 do not affect the feedback control circuit 116 but allows the feedback control circuit 116 to provide a control signal, passed through the safety isolation circuit 115, to the AC-DC power converter 114 in order to adjust the DC voltage level of the DC voltage output of the AC-DC power converter 114. This control signal, which controls the DC voltage level of the DC voltage output, is in turn controlled by an input signal received by the feedback control circuit 116 from the controller 112. The feedback control circuit 116 draws power from the voltage supply bus 110 as shown in FIG. 1A. Two embodiments of the feedback control circuit 116 are shown in FIGS. 6A and 6B and are described further below in conjunction with those figures; it will be appreciated that alternative implementations of a feedback control circuit may also be used with embodiments of the invention.

The power control logic 125 includes one or more DC to DC converter(s) 109, which provide a conversion (e.g., shift) from an input DC voltage to an output DC voltage which can be a regulated DC voltage, and an analog to digital (A/D) converter 111 and at least one controller 112. The DC to DC converter 109 receives its input DC voltage from the voltage supply bus 110 which is driven by the DC voltage output from the AC-DC power converter 114, and this input DC voltage is converted by the DC to DC converter 109 into the DC output voltage 121 shown as Vs which is used to provide DC power to various components in the system including microprocessor(s) 103, memory 104, mass storage 105 and controller 112. In certain embodiments, additional DC to DC converters may be included to provide a set of DC voltages (e.g. Vp, which may be the same as or different than Vs) to other components as shown in FIG. 1A, and in certain embodiments the bidirectional connection between the controller 112 and the DC to DC converter(s) 109 can be used to control the DC to DC converter(s) 109 (e.g., to turn one or more of the converters off). In the example shown in FIG. 1A, the controller 112 receives power (Vs) from the DC to DC converter(s) 109, so the controller 112, the DC to DC converter(s) 109, the A/D converter 111 and the AC input power supply 113 will all be drawing power during all operative states (e.g., active power state, low power state, and standby power state) in at least certain embodiments. This allows the system to respond to a user, even in standby power state, when the user activates a user control, such as the user control 126. The A/D converter 111 has an input coupled to the voltage supply bus 110 to receive the DC voltage output from the AC-DC power converter(s) 114, and the A/D converter 111 has an output, coupled to the controller 112, which provides a digital representation, of the analog DC voltage on the voltage supply bus 110 to the controller 112. In an alternative embodiment, the controller 112 may include an A/D converter and hence can provide its own A/D conversion. The controller 112 uses the digital representation of the analog DC voltage on the voltage supply bus 110 to monitor the DC voltage inputted to the DC to DC converter 109 and to adjust the DC voltage inputted to the DC to DC converter 109 depending on the operative state as described further in this disclosure. The controller 112 includes an output which provides a control signal to the feedback control 116; this control signal adjusts the feedback control 116 which in turn changes the DC voltage output from the AC-DC power converter. By adjusting this DC voltage output, the controller 112 can change the input/output voltage ratio of the DC to DC converter 109 in order to improve efficiency (relative to a system which does not attempt to so control this input/output voltage ratio); in other words, the controller 112 can, in response to monitoring of the DC voltage output and in response to the operative state (e.g. active power state, low power state, or standby state), decrease the input/output voltage ratio (DC voltage input into the DC to DC converter divided by the DC voltage output from DC to DC converter) of the DC to DC converter. In the standby state, the controller 112 can decrease the DC voltage output of the AC-DC converter (which is the DC voltage input to DC to DC converter 109), while the DC voltage Vs from the DC to DC converter 109 remains substantially (typically within +/−3%) unchanged. As long as the decrease of the DC voltage output keeps the DC voltage input to the DC to DC converter within an acceptable operating range of the DC to DC converter, then the controller 112 can improve the power efficiency of the whole system (relative to a system which does not attempt to so control the input/output voltage ratio of the DC to DC converter 109. The controller 112 may be a digital microcontroller which is configured to perform these operations by software (e.g. firmware) which is written to cause these operations; in other embodiments, the controller 112 may implement these operations through the use of hardware logic or a combination of hardware logic and software.

The user controls 126 may be one or more buttons, switches, or other user interface input to the controller 112. The system can still respond to user input applied the user controls 126 even when the system is operating in low power state or standby state because power is supplied to the controller 112 in these states (as well as in an active power state.)

Figure 1B:
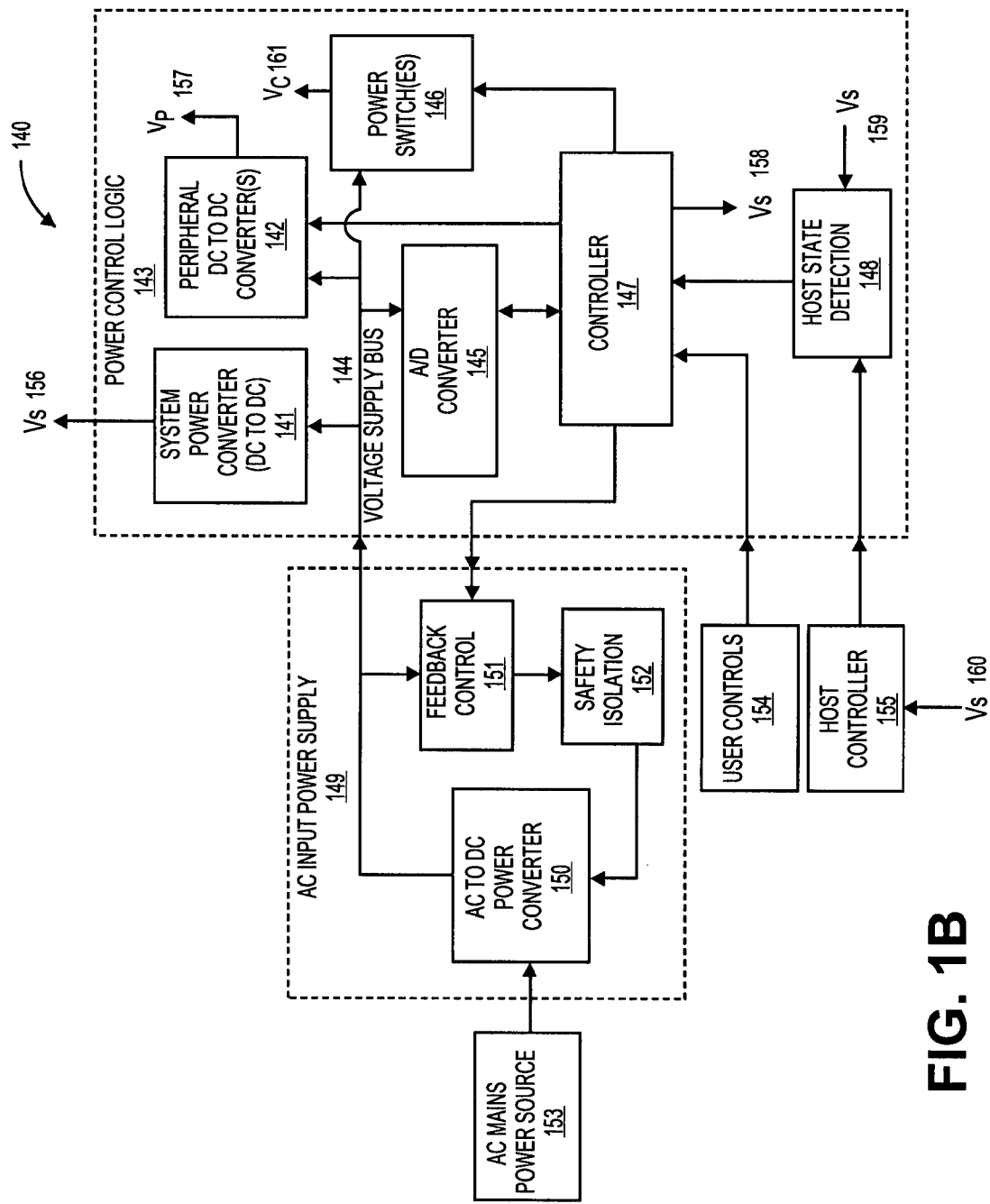
FIG. 1B illustrates an embodiment of a power management system which can be used to manage power consumption of an apparatus receiving power from the power management system according to at least certain embodiments described herein.

FIG. 1B illustrates a system view of an implementation of a power supply system which can supply power to an apparatus such as a data processing system. The power management system 140 comprises of a power control logic 143, which comprises of a plurality of DC to DC converters, such as a system power converter 141 and a peripheral DC to DC converter 142. A DC to DC converter converts one DC voltage level to a second DC voltage level. The second DC voltage level may be a regulated DC voltage. The system power converter 141 provides an output DC voltage Vs which provides power to one or more components in the apparatus. The peripheral DC to DC to converter 143 provides power to one or more peripheral ports or devices (not shown here) such as USB hubs or ports, and may have one or more the peripheral voltage output(s) 157 (e.g. Vp) coupled to it. The analog to digital (A/D) converter 145 may be any A/D converter known to those skilled in the art that converts continuous analog signals to discrete digital signals. The system power converter 141, the peripheral DC to DC converter 142 and the A/D converter 145 are coupled to the voltage supply bus 144. A controller 147 remains active while the data processing system is in operative state and monitors the system to determine the state the apparatus is operating under (e.g., active, low power, or standby.) Controller 147 is similar to controller 112 and is coupled with the AC input power supply 149 to control the DC voltage level on the voltage supply bus 144. The AC input power supply 149 comprises of an AC to DC power converter 150, a feedback control 151 and a safety isolation 152; AC input power supply 149 is similar to AC input power supply 113. AC to DC power converter transforms AC power received from the AC mains power source 153 to DC power. The feedback control 151 and the safety isolation 152 are similar in function and operation to the feedback control 116 and the safety isolation 115, respectively, in FIG. 1A. The power control logic 143 may also be coupled with user controls 154 and a host controller 155. The host controller 155 may also contain one or more voltage input(s) 160 to supply power to the host controller (in those embodiments in which the host controller is part of the apparatus which receives power from power management 140). In certain embodiments, the host controller may be in another apparatus; for example, if the apparatus receiving power from the power management system 140 is a display device (such as the display device shown in FIG. 1C), then the host controller is part of a computer (or other device with a display output to drive a display device), and this host controller drives and/or controls the driving of the display output signals to the display device.

Figure 4A:
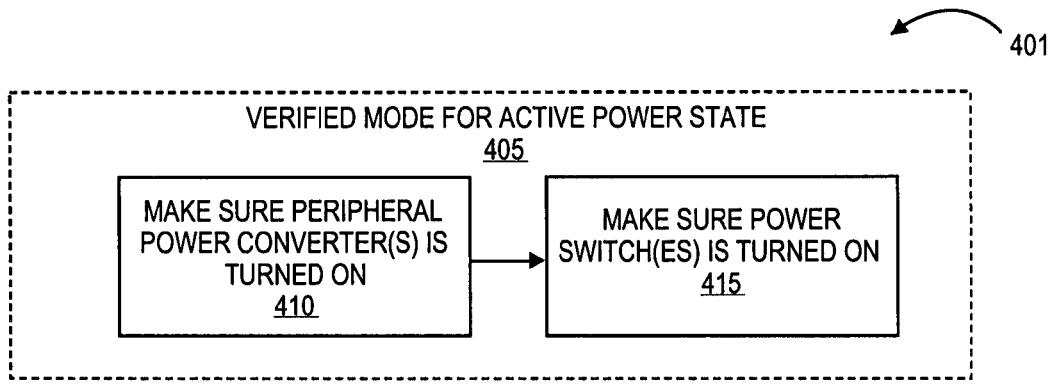
FIG. 4A illustrates a flow chart of an embodiment of a method when a data processing system enters verified mode for active power state.
Figure 4B:
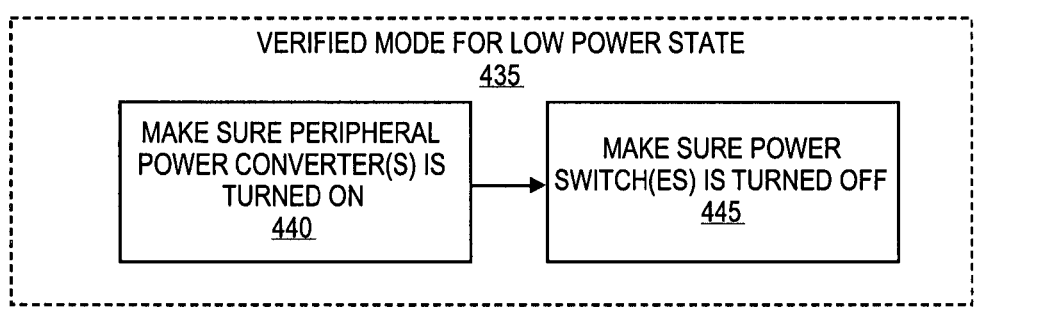
FIG. 4B illustrates a flow chart of an embodiment of a method when a data processing system enters verified mode for low power state.
Figure 4C:
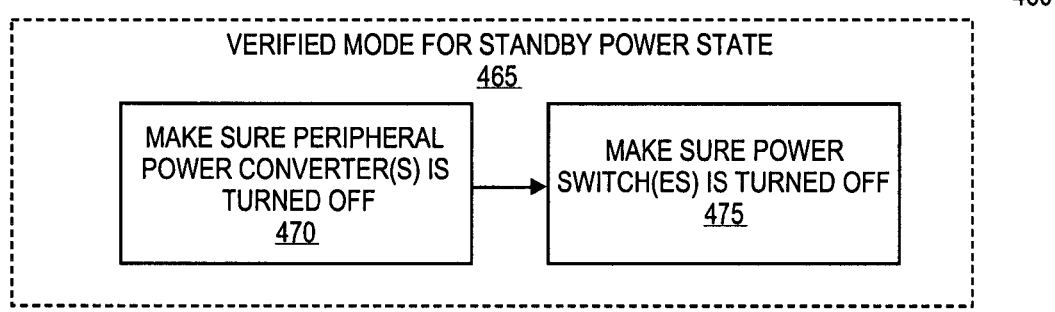
FIG. 4C illustrates a flow chart of an embodiment of a method when a data processing system enters verified mode for standby power state.

In one embodiment, the controller 147 remains active when the system is operating. The controller 147 is configured to monitor the user controls 154 and the host state detection 159 to determine the operative state (e.g., active, low power, or standby) or a change in the operative state of the system. The controller 147 is further configured to determine the voltage level on the voltage supply bus 144. Based on the operative state of the system and the voltage level on the voltage supply bus 144, the controller 147 is configured to determine whether the voltage level on the voltage supply falls within a preset range of valid voltage level as determined the system's operative state. Typically, valid voltage levels range between, for example, 6 to 24V, depending on the system's design and operative state. The valid voltage level may be close to 24V when the apparatus is operating in active power state and close to 6V when the apparatus system is operating in standby state. If the controller 147 determines that the voltage level on the voltage supply bus 144 is within the preset range, the system enters verified mode (FIGS. 4A, 4B, and 4C). In verified mode, the controller 147 is configured to turn on the peripheral DC to DC converter(s) 142 and the power switch(es) 146 when the system is operating in an active power state. (See FIG. 4A). The controller 147 is configured to turn on the peripheral DC to DC converter(s) 142 and turn off the power switches 146 when the system is operating in low power state. (See FIG. 4B). The controller 147 is configured to turn off the peripheral DC to DC converter(s) 142 and the power switches 146 when the system is operating in standby state. (See FIG. 4C).

Figure 5A:
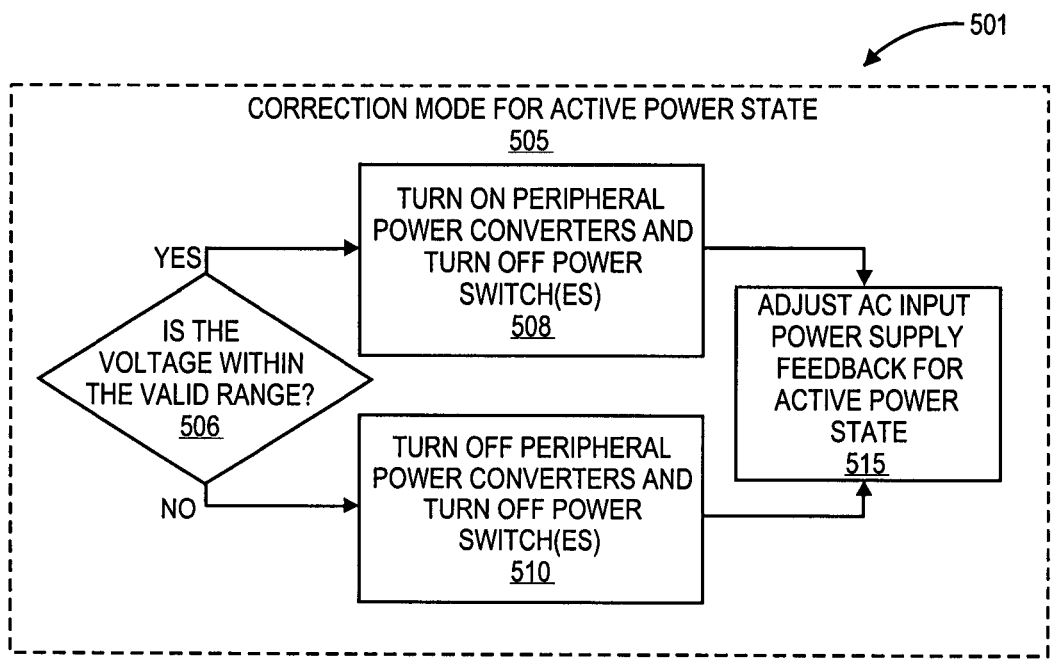
FIG. 5A illustrates the flow of actions taken according to an embodiment of method when a computer system enters correction mode for active power state.
Figure 5B:
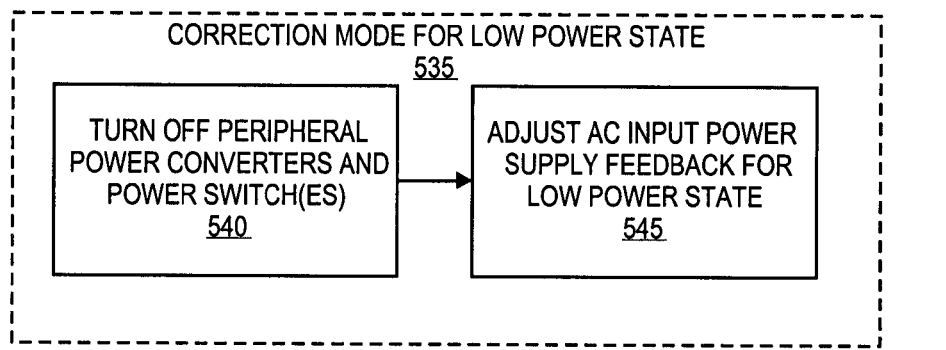
FIG. 5B illustrates the flow of actions taken according to an embodiment of a method when a computer system enters correction mode for low power state.
Figure 5C:
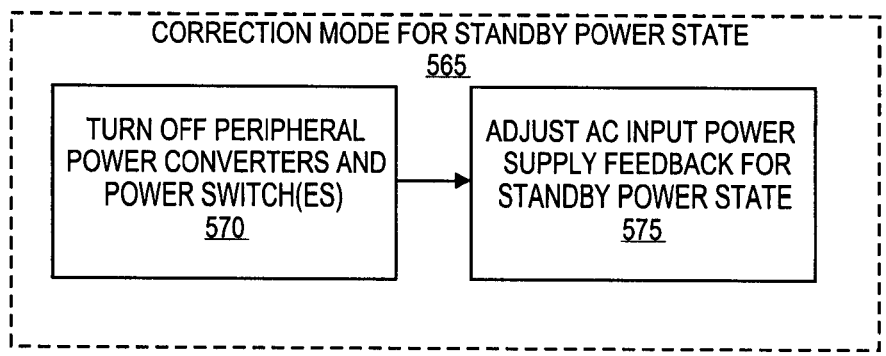
FIG. 5C illustrates the flow of actions taken according to an embodiment of a method when a computer system enters correction mode for standby power state.

On the other hand, if the controller 147 determines that the voltage level on the voltage supply bus 144 is not within the preset range, the system enters correction mode (See FIGS. 5A, 5B, and 5C). When a system is in correction mode, the controller 147 is configured to turn off the power switch(es) 146 and the peripheral DC to DC converter(s) 142 and changes the DC output voltage of the AC input power supply 149 accordingly.

When the computer system is in an operative state, power converters that are coupled with the voltage supply bus 144 (e.g., system power converter 141 and peripheral DC to DC converter(s) 142.) draw constant power from voltage supply bus 144. Therefore, when the controller 147 decreases the output voltage of the feedback control 151, which results in a decrease in the input voltage of the DC to DC converters coupled with the system voltage bus 144, the input current of the DC to DC converters increases to maintain constant power. To avoid excessive current draw by the DC to DC converters, the controller 147 shuts down power switch(es) 146 and peripheral DC to DC converter(s) 142 before adjusting the DC output voltage of the AC input power supply 149 to transition to standby power state. To prevent excessive current draw, the controller 147 shuts down power switch(es) 146 before adjusting the DC output voltage of the AC input power supply 149 to transition to low power state.

In one embodiment, the output signal from the feedback control 151 is adjusted by a feedback attenuation signal from the controller 147. FIG. 6A illustrates an implementation of the AC input power supply 601 (block 149 in FIG. 1B) coupled with the AC mains power source 602. AC input power supply 601 includes an AC to DC power conversion 603, which is similar to AC to DC converter 150, protection circuitry (e.g., short-circuit, over voltage) 604, and a safety isolation 605 and 606. The protection circuitry 604 is coupled with the power control logic (not shown here, block 143 of FIG. 1B) and the feedback control 607 through the voltage supply bus 617. The feedback control 607 comprises a plurality of impedance devices 608, 609, 611, and 612, and a plurality of switches 613 and 614. Feedback control 607 further comprises of amplifier 610.

In one embodiment, the voltage output 618 is controlled by a controller (not shown, block 147 in FIG. 1B). In one implementation, the output voltage 618 is directly related to the feedback attenuation in the AC input power supply 601. To decrease the output voltage 618, the controller sets the output voltage 618 at discrete levels. This may be achieved by using general purpose I/O lines on the controller 147 to drive attenuation controls 615 and 616. Switch 1 613 and switch N 614 can be turned on or off to increase or decrease voltage output 618.

In another embodiment, the DC output voltage of the AC input power system 149 in FIG. 1B is adjusted linearly. FIG. 6B illustrates an implementation of an AC input power supply 651 (block 149 in FIG. 1B). In this implementation, the AC Input power supply 651 includes an AC to DC power conversion 653, protection circuitry (e.g., short-circuit, over voltage) 654, and a safety isolation 655 and 656. The protection circuitry 654 is coupled with the power control logic (not shown here, block 143 in FIG. 1B) and the feedback control 657 through the voltage supply bus 667. The feedback control 657 comprises of impedance devices 658 and 659, an amplifier 660 and a voltage to current source 661.

In one embodiment, a controller (not shown, block 147 in FIG. 1B) is connected with the AC input power supply 651 to provide the attenuation control 665 as an input to the AC input power supply 651. The controller contains a digital to analog converter (DAC) (not shown), and uses the DAC to set the attenuation control 665, which in turn sets the DC output voltage of the AC input power supply 651 linearly. In one implementation, the controller is configured to reduce the output voltage of the DAC, which is fed into the feedback control 657. A decrease in the output voltage of the DAC will cause the voltage to current source 661 to reduce the current draw in the feedback control 657, which will cause the voltage on the voltage supply bus 617 to decrease by the attenuation control 665.

Figure 1C:
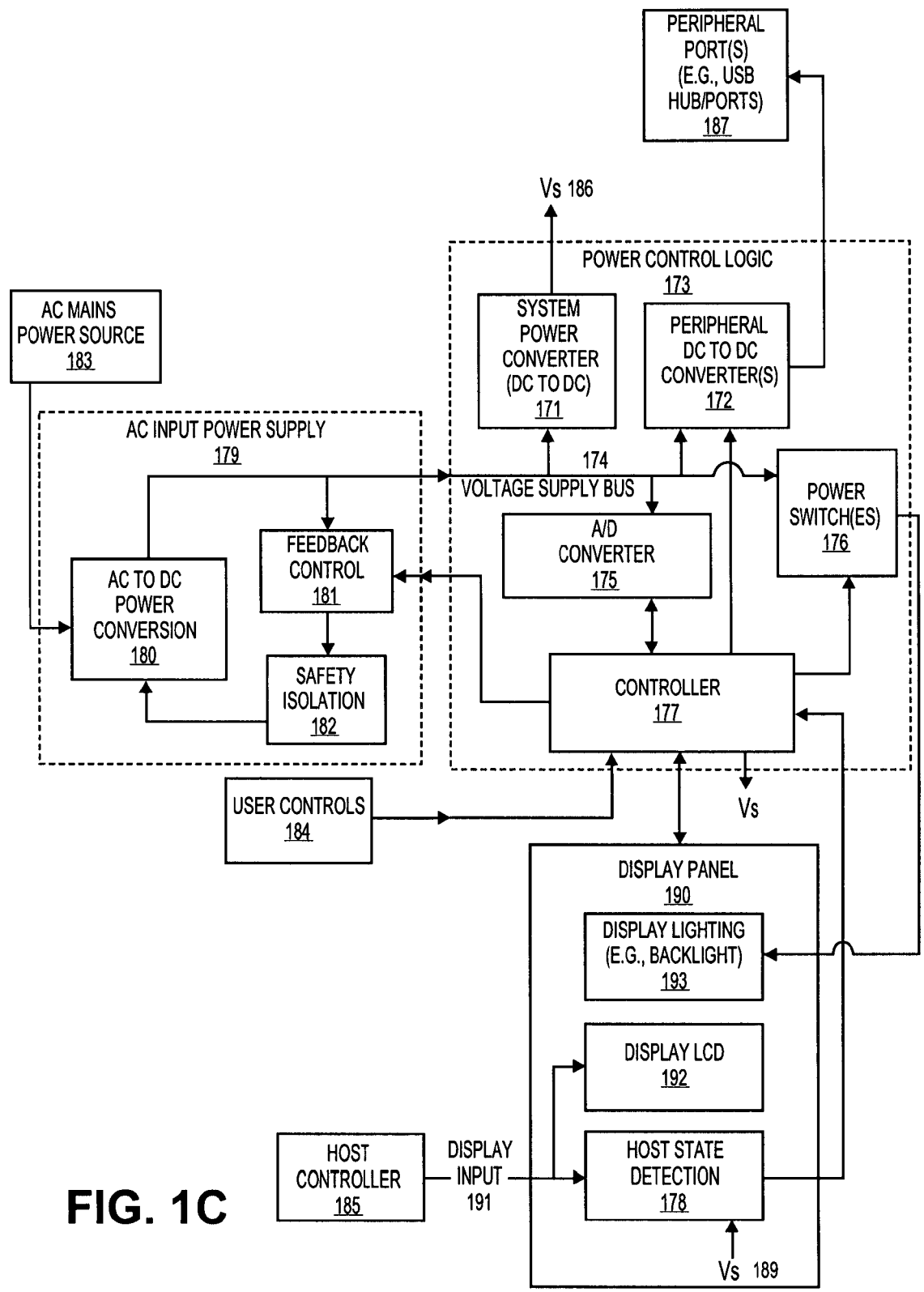
FIG. 1C illustrates an embodiment of a display device according to certain aspects of the present invention.

FIG. 1C shows another embodiment of the present invention. In this implementation, the power control logic 173 is further connected with a display panel 190 and one or more peripheral port(s) 187. The display panel 190 may comprise of a display lighting 193, a display LCD 192, and a host detection 178. The display lighting 193 is connected with power switches 176 which can turn the display lighting 193 (and the drivers which drive the lighting on or off). In this embodiment, because the display lighting 193 receives voltage supply from the power switches 176, the display lighting 193 turns on and off when the power switches 176 are turned on or off when the system enters correction or validated mode. (See FIGS. 4A-C and 5A-C). FIG. 1C shows an example in which the apparatus, which receives power through an embodiment of the power management system of the invention is a display device.

Figure 2:
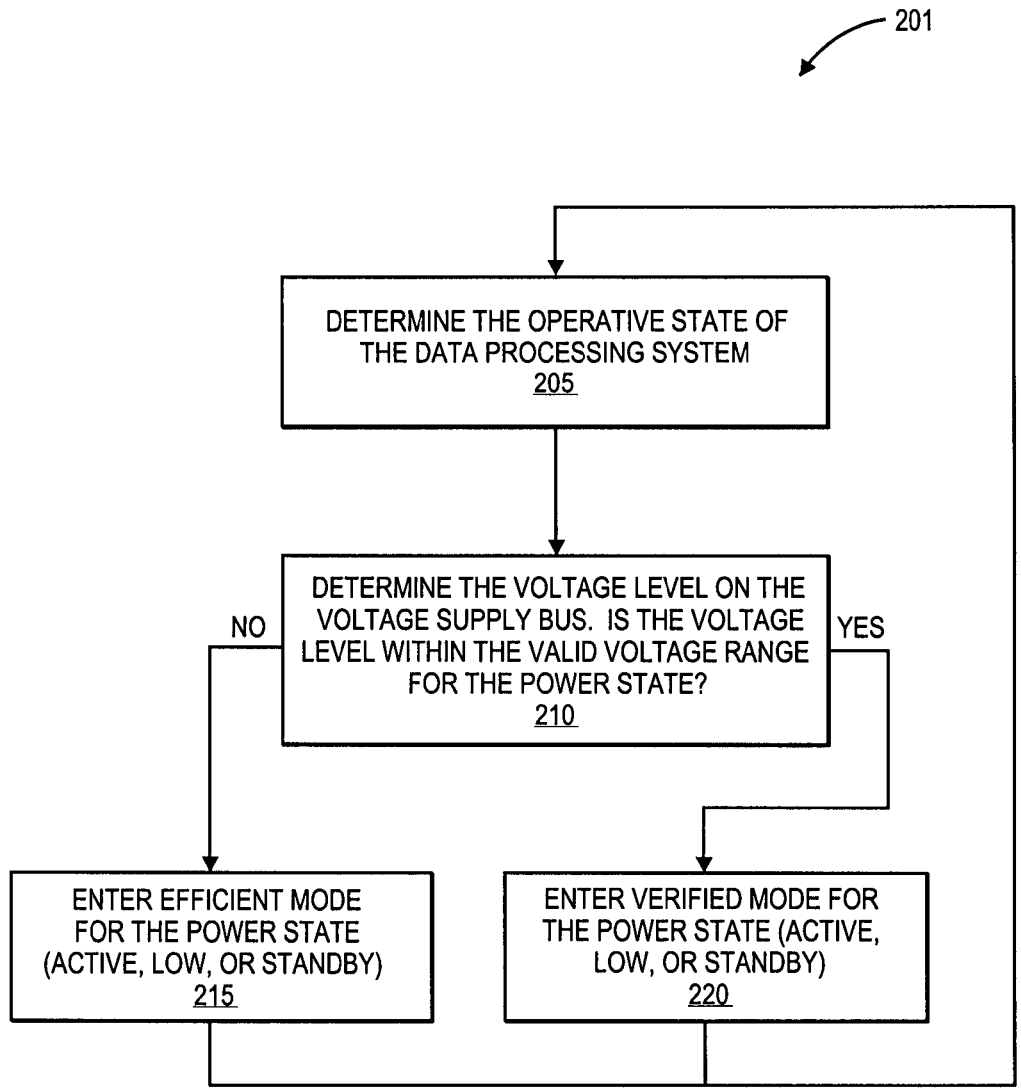
FIG. 2 illustrates the flow of actions taken according to an embodiment of a method to improve power efficiency of a data processing system.

FIG. 2 shows a generalized example of one embodiment of the present invention. The method of FIG. 2 may begin operation in operation in 205, in which the operative state of the computer system is determined. The voltage level on the voltage supply bus (e.g. voltage supply bus 110, 144, 174, 618, or 668) is determined in 210. The voltage level on the voltage supply bus may be measured by sampling performed by the A/D converter (e.g., block 145 in FIG. 1B) several times and averaging the values to eliminate erroneous responses due to noise on the bus 210. The voltage level on the voltage supply bus is compared in the controller (e.g. controllers 112, 147, or 177) with a preset valid voltage range for the current power state. The system's current power state (e.g. active power, low power, or standby state) is known by the controller. If the voltage level determined on the voltage supply bus is within the valid voltage range, the controller causes the system to enter the verified mode for the corresponding power state in 220. If the voltage level determined on the voltage supply bus is not within the valid voltage range, the controller causes the system to enter the correction mode 215 for the corresponding power state.

Figure 3:
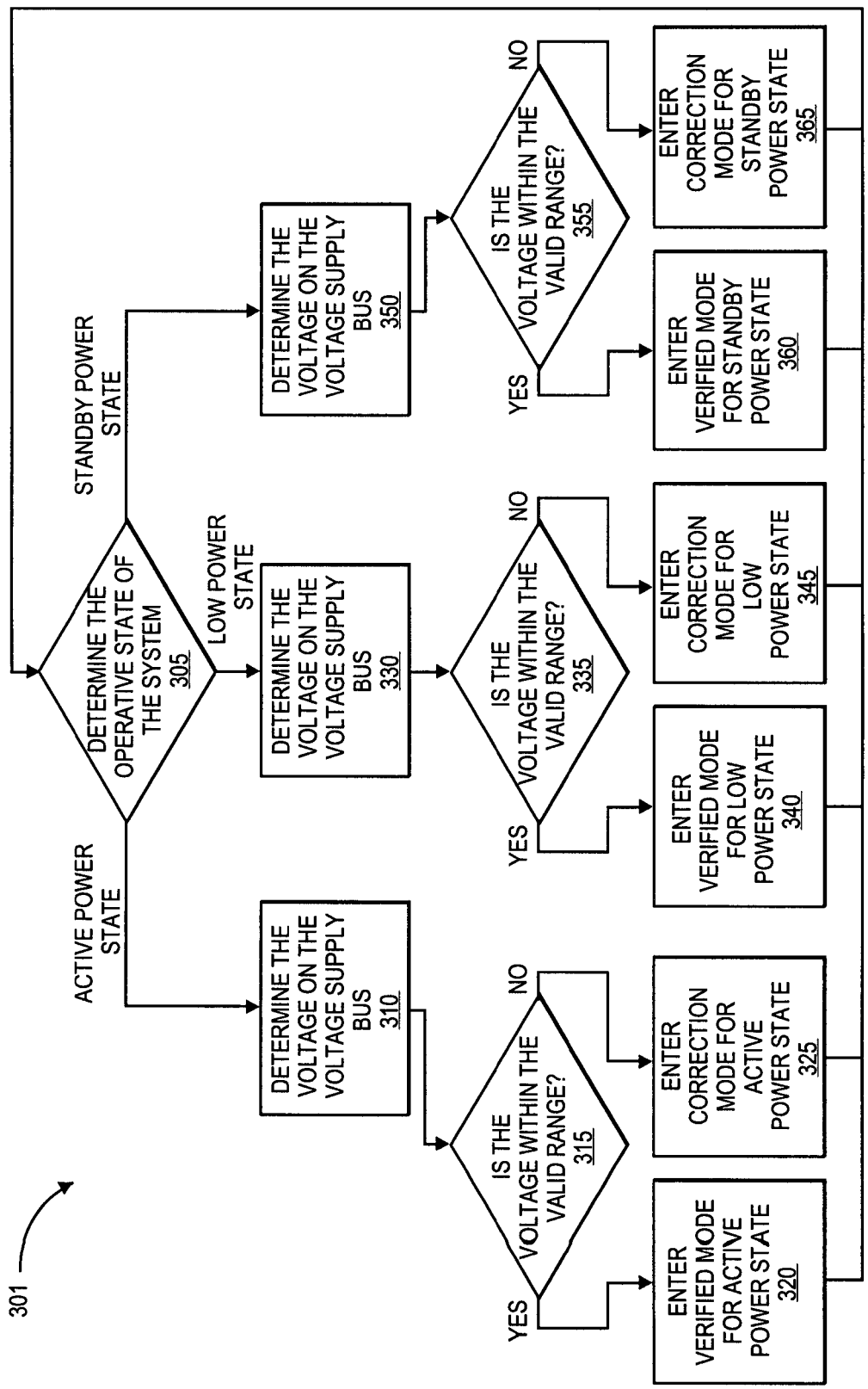
FIG. 3 illustrates a flow chart of actions according to the embodiment of a method as illustrated in FIG. 2.

FIG. 3 shows a detailed flow of actions as according to the embodiment of the method illustrated in FIG. 2 (with the power management system shown in FIG. 1B). The method of FIG. 3 may begin in operation in 305, in which the operative state of the system is determined. In 310, 330, and 350, the voltage on the voltage supply bus (e.g. voltage supply bus 110, 144, 174, 618, or 668) is determined. In 315, 335, and 355, the voltage level on the voltage supply bus is compared with a preset valid voltage range for the current power state. If the system's operative state is active power state and the voltage level determined on the voltage supply bus is within a preset valid voltage range for active power state, the controller causes the system to enter the verified mode for active power state in 320. If the system's operative state is active power state and the voltage level determined on the voltage supply bus is not within a preset valid voltage range for active power state, the controller causes the system to enter the correction mode for active power state in 325. Similarly, if the system's operative state is low power state, the controller causes the system to enter verified mode for low power state 340 if the voltage level measured on the voltage bus is within a preset valid voltage range for low power state, and to enter correction mode for low power state 345 if the voltage level measured on the voltage bus is not within a preset valid voltage range for low power state. Lastly, the controller causes the system to enter verified mode for standby power state 360 if the voltage level measured on the voltage bus is within a preset valid voltage for standby power state and correction mode for standby power state 365 if the voltage level is not within a preset valid voltage level for standby power state. Alter the computer undergoes the respective verified or correction mode for the operative state of the computer system, method 301 loops back to block 305, and a new iteration of the method may be repeated.

FIGS. 4A, 4B, and 4C illustrate exemplary embodiments of the present invention when the system enters the verified mode. In verified mode for active power state 405, as shown in FIG. 4A, the peripheral power converter(s) is turned on in 410 and the power switch(es) is turned on in 415. In verified mode for low power state 435, as shown in FIG. 4B, the peripheral power converter(s) is turned on in 440 and the power switch(es) is turned off in 445. Lastly, in verified mode for standby power state 465, as shown in FIG. 4C, the peripheral power converter(s) is turned off in 470 and the power switch(es) is turned off in 475.

FIGS. 5A, 5B, and 5C illustrate exemplary embodiments of the present invention when the system enters the correction mode. When the system is in active operative mode, power converters (e.g., system power converter 141 and peripheral DC to DC converter(s) 142 in FIG. 1B) coupled with the voltage supply bus (voltage supply bus 144 in FIG. 1B) draw constant power. When the input voltage that is fed into these converters decreases because the power supply feedback for active power state is adjusted in 515, the input current that is fed into the power converters increases to maintain constant power. To avoid the excessive current draw, the controller decides if the power switches and peripheral power converters are turned off. In correction mode for active power state 505, as shown in FIG. 5A, the controller checks if the voltage supply bus is within the intermediate voltage range in 506. The intermediate voltage range is below the active power state range and above the low power state range. If the voltage supply bus is within the valid range, the peripheral power converter(s) is turned on and the power switch(es) is turned off in 508. Otherwise, the power converter(s) and power switch(es) are turned off in 510. In correction mode for low power state 530, as shown in FIG. 5B, the power switch(es) and peripheral power converter(s) are turned off in 540 for the excessive current draw reasons stated above and the AC input power supply feedback for low power state is adjusted in 545. In correction mode for standby power state 560, as shown in FIG. 5C, the power switch(es) and peripheral power converter(s) are turned off in 570 for the excessive current draw reasons stated above and the AC input power supply feedback for active power state is adjusted in 575.

FIG. 7 is a graph of two voltages, Vout and Vin over time as a system, such as the system shown in FIGS. 1A or 1C, moves through different power states. The voltage Vout represents the DC voltage output from a DC to DC converter, such as the DC to DC converter(s) 109 in FIG. 1A or the DC to DC converter 171 in FIG. 1C, and the voltage Vin represents the DC input voltage which is inputted to that DC to DC converter. The voltage Vin is the voltage on the voltage supply bus (e.g. bus 110 in FIG. 1A or bus 174 in FIG. 1C) which is controlled by a controller, such as controller 112 in FIG. 1A or controller 177 in FIG. 1C. The voltage Vout remains substantially the same over time in the different power states; it may vary slightly (for example, +/−3%) in practice but this is considered substantially the same as the variation is within an acceptable range (of, for example, +/−3%). On the other hand, the voltage Vin varies depending upon the operating state of the system. The graph in FIG. 7 shows the ratio Vin/Vout in each state/mode and shows how the controller (e.g. controller 112) varies the ratio in the different states. In particular, in the change from the active power state (during period $t_0$ to $t_1$) to the low power state (during period $t_1$ to $t_2$), the controller decreases Vin (by as much as 60%, for example, in one embodiment) while Vout remains substantially fixed; this change improves the power efficiency of the system (relative to a system which does not change the Vin Vout ratio) as described above. In the change from the low power state, which exists from $t_1$ to $t_2$, to the standby state (which exists during period $t_2$ to $t_3$), the controller further decreases Vin (by as much as 75%, in one embodiment, relative to Vin during the active power state) to further improve the power efficiency of the system. The reduction of Vin also decreases the power consumption of the AC to DC converter regulation circuits, such as the protection circuitry (604 or 654 in FIG. 6A or 6B). In the change from the standby power state, which exists during time $t_2$ to $t_3$, to the active power state, the controller increases Vin back to its normal operating voltage during the active power state; this change may occur as a result of a user activating a user control or plugging in a USB Flash drive into the system or the reappearance (after a sleep or shutdown period) of a video signal being inputted into the system (in the case of the system of FIG. 1C), etc. The other changes occur in a typical use of the system. For example, the system, when in an active power mode, is normally being used by the user (e.g., the user is entering data or watching a video or reviewing a document displayed by the system). After a period of inactivity (no user input for over X minutes, the input display has not changed for X minutes, etc.), the system may automatically move (at time $t_1$) from the active power mode to the low power mode; in one embodiment in which the system is a display device (e.g. the system shown in FIG. 1C), the change at time $t_1$ may involve turning off the backlight for an LCD display (and turning off the power switches which provide the power to the backlight) while the rest of the system (e.g. the USB hub and ports) continues to receive power. The controller can be, in one embodiment, managing power by determining system inactivity. After a period of further inactivity (a continued period of time in which no user input has been received, the display's input has been off for an additional period of time, etc.), the system at time $t_2$ may, under control of the controller, move from the low power mode to the standby power mode in which only some circuits receive power (e.g. in the case of FIG. 1C, only the AC input power supply, the controller 177, the A/D converter 175, the DC to DC converter 171, the user controls 184, and the Host state detection circuitry 178 receive power while the rest of the system does not receive power). The system, while in the standby power mode can be awakened by, for example, the activation of a user control or the receipt of live display input data (e.g. the user has turned on a display driver in a computer or other apparatus); this awakening is recognized by the controller which causes the change, at time $t_3$, from the standby power mode to the active power mode (in which all circuits in the system may receive power).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. The terms used in the following claims should not be construed to limit the invention to the specific embodiments disclosed in the specification and the claims. Rather, the scope of the invention is to be determined entirely by the following claims, which are to be construed in accordance with established doctrine of claim interpretation.

What is claimed is:

1. A power supply system for an apparatus, the power supply system comprising:
an AC (alternating current) to DC (direct current) converter having an input to receive an AC voltage from an AC source and having a DC voltage output and having a control input, the control input being configured to control a voltage of the DC voltage output;
a first DC to DC converter having an input coupled to the DC voltage output and having an output configured to provide a DC supply voltage to a first component of the apparatus;
a controller having a first input coupled to the DC voltage output and having a first output coupled to the control input of the AC to DC converter, the controller being configured to monitor an operating state of the apparatus and to adjust, in response to the monitoring of the operating state of the apparatus, a parameter of a signal of the first output of the controller, the parameter adjustment causing the AC to DC converter to reduce the voltage of the DC voltage output while maintaining the DC supply voltage output from the DC to DC converter.

2. The power supply system of claim 1 wherein the apparatus is a data processing system.

3. The power supply system of claim 1 wherein the apparatus is a display device which is configured to be coupled to a data processing system.

4. The power supply system of claim 1 wherein the DC supply voltage provides power to the controller.

5. The power supply system of claim 1 wherein in a standby power mode, the controller is configured to reduce the voltage of the DC voltage output from the AC to DC converter.

6. The power supply system of claim 5 wherein the controller reduces the voltage of the DC voltage output to a minimal acceptable level in an operating range of an input DC voltage at the input of the first DC to DC converter.

7. The power supply system of claim 6 wherein reducing the voltage of the DC voltage output increases a power efficiency of the power supply system.

8. The power supply system of claim 7 wherein reducing the voltage of the DC voltage output lowers power consumed by the apparatus during standby mode.

9. The power supply system of claim 6, wherein the first DC to DC converter provides power to the controller and wherein the power supply system further comprises:
an analog to digital (A/D) converter having an input coupled to the DC voltage output of the AC to DC converter and having an output coupled to the first input of the controller, the A/D converter being configured to convert an analog voltage value to a digital voltage value to allow the controller to monitor the voltage of the DC voltage output, and wherein the controller is coupled to the DC voltage output through the A/D converter.

10. The power supply system of claim 6 further comprising:
a user control input device having an output coupled to a second input of the controller, the controller being configured to determine, during a standby mode, whether a user has caused an input to the user control input device.

11. The power supply system of claim 10 further comprising:
an input controller coupled to the controller, the input controller being configured to determine an existence of a valid input and to provide a signal to the controller that a valid input exists in order to cause the controller to cause the apparatus to exit the standby power mode.

12. The power supply system of claim 11 wherein the first DC to DC converter provides power to the controller and wherein the controller is coupled to the DC voltage output through an analog to digital converter.

13. The power supply system of claim 12 wherein the apparatus is a display device.

14. The power supply system of claim 13 further comprising:
a power switch coupled to the DC voltage output and having an input coupled to the controller to allow the controller to turn off the power switch to stop delivery of power to a device coupled to an output of the power switch.

15. The power supply system of claim 14 further comprising:
a further DC to DC converter having an input coupled to the DC voltage output and having an output configured to provide a further DC supply voltage to a second component of the apparatus.

16. The power supply system of claim 15 wherein the second component comprises an input/output data port.

17. A method for operating a power supply comprising:
monitoring a system state of a system receiving power from the power supply to determine whether the system is in at least one of a standby mode or a low power mode;
converting, in an AC to DC converter in the power supply, an AC voltage to a DC voltage to generate an input DC voltage that is inputted to a DC to DC converter;
reducing the input DC voltage to the DC to DC converter while maintaining an output DC voltage from the DC to DC converter in an acceptable range, if the system is in at least one of the standby mode or the low power mode.

18. The method as in claim 17 wherein the reducing is done in response to a change in a power operating state of the system which receives power, at least in part, from the DC to DC converter.

19. The method as in claim 18 wherein the change is one of (a) a change from full power mode to low power mode; (b) a change from low power mode to standby power mode; (c) a change from full power mode to standby power mode; (d) a change from standby power mode to full power mode; (e) a change from standby power mode to low power mode; and (f) a change from low power mode to full power mode.

20. The method as in claim 18 wherein the reducing lowers the input DC voltage in response to entering a lower power consumption state and wherein the monitoring and the reducing is performed by a controller which is powered by the DC to DC converter.

21. The method as in claim 20 wherein the controller provides a control signal to the AC to DC converter which provides the input DC voltage to the DC to DC converter, and wherein the control signal causes the reducing.

22. The method as in claim 21 wherein the reducing decreases power consumption in the AC to DC converter.

23. The method as in claim 22 wherein the control signal sets the input DC voltage at one of several discrete levels.

24. The method as in claim 22 wherein the control signal linearly sets the input DC voltage.

25. A machine readable non-transitory storage medium storing executable instructions which when executed cause a system to perform a method for operating a power supply, the method comprising:
monitoring a system state of a system receiving power from the power supply to determine whether the system is in at least one of a standby mode or a low power mode;

converting, in an AC to DC converter in the power supply, an AC voltage to a DC voltage to generate an input DC voltage that is inputted to a DC to DC converter;

reducing the input DC voltage to the DC to DC converter while maintaining an output DC voltage, from the DC to DC converter, substantially constant, if the system is in at least one of the standby power mode or the low power mode.

26. The medium as in claim 25 wherein the reducing is done in response to a change in a power operating state of the system which receives power, at least in part, from the DC to DC converter.

27. The medium as in claim 26 wherein the change is one of (a) a change from full power mode to low power mode; (b) a change from low power mode to standby power mode; (c) a change from full power mode to standby power mode; (d) a change from standby power mode to full power mode; (e) a change from standby power mode to low power mode; and (f) a change from low power mode to full power mode.

28. The medium as in claim 26 wherein the reducing lowers the input DC voltage in response to entering a lower power consumption state and wherein the monitoring and the reducing is performed by a controller which is powered by the DC to DC converter.

29. The medium as in claim 28 wherein the controller provides a control signal to the AC to DC converter which provides the input DC voltage to the DC to DC converter, and wherein the control signal causes the reducing.

30. A power supply system for an apparatus, the power supply system comprising:

an AC (alternating current) to DC (direct current) converter having an input to receive an AC voltage from an AC source and having DC voltage output and having a control input, the control input being configured to control a voltage of the DC voltage output;

a first DC to DC converter having an input coupled to the DC voltage output and having an output configured to provide a DC supply voltage to a first component of the apparatus;

a controller having a first input coupled to the DC voltage output and having a first output coupled to the control input of the AC to DC converter, the controller being configured to monitor an operating state of the apparatus and to adjust, in response to the monitoring of the operating state, a parameter of a signal of the first output of the controller, the parameter adjustment causing the AC to DC converter to reduce the voltage of the DC voltage output while maintaining the DC supply voltage output from the DC to DC converter in an acceptable range.

31. The power supply system of claim 30 wherein the apparatus is one of a data processing system or a display device.

32. The power supply system of claim 31 wherein the DC supply voltage provides power to the controller.

33. The power supply system of claim 32 wherein in a standby power mode, the controller is configured to reduce the voltage of the DC voltage output from the AC to DC converter.

34. The power supply system of claim 33 further comprising:

a user control input device having an output coupled to a second input of the controller, the controller being configured to determine, during a standby mode, whether a user has caused an input to the user control input device.

* * * * *